(12) United States Patent
Schaefer et al.

(10) Patent No.: US 10,800,249 B2
(45) Date of Patent: Oct. 13, 2020

(54) FAN SHROUD OF A MOTOR VEHICLE

(71) Applicant: BROSE FAHRZEUGTEILE GMBH & CO. KOMMANDITGESELLSCHAFT, WÜRZBURG, Würzburg (DE)

(72) Inventors: Tilman Schaefer, Edewecht (DE); Antje Findeisen, Oldenburg (DE)

(73) Assignee: BROSE FAHRZEUGTEILE GMBH & CO. KOMMANDITGESELLSCHAFT, WÜRZBURG, Würzburg (DE)

( * ) Notice: Subject to any disclaimer, the term of this patent is extended or adjusted under 35 U.S.C. 154(b) by 0 days.

(21) Appl. No.: 16/555,610

(22) Filed: Aug. 29, 2019

(65) Prior Publication Data

US 2020/0070645 A1 Mar. 5, 2020

(30) Foreign Application Priority Data

Aug. 30, 2018 (DE) .................. 10 2018 214 782

(51) Int. Cl.
*B60K 11/04* (2006.01)
*F01P 11/10* (2006.01)
*F01P 5/06* (2006.01)
*F04D 29/52* (2006.01)

(52) U.S. Cl.
CPC .............. *B60K 11/04* (2013.01); *F01P 5/06* (2013.01); *F01P 11/10* (2013.01); *F04D 29/526* (2013.01)

(58) Field of Classification Search
CPC ...................................... B60K 11/04
See application file for complete search history.

(56) References Cited

U.S. PATENT DOCUMENTS

| 5,626,202 | A | * | 5/1997 | Barnes | ................... | B60K 11/04 165/121 |
| 5,771,961 | A | * | 6/1998 | Alizadeh | ................ | B60K 11/04 165/121 |
| 2008/0078340 | A1 | | 4/2008 | Havel | | |
| 2012/0321474 | A1 | | 12/2012 | Stevens et al. | | |
| 2015/0125287 | A1 | | 5/2015 | Briand | | |

(Continued)

FOREIGN PATENT DOCUMENTS

| DE | 19638518 A1 | 4/1998 |
| DE | 102012202889 A1 | 8/2013 |

(Continued)

OTHER PUBLICATIONS

European Search Report for European Application No. 19188756.1; dated Jan. 23, 2020, 6 pages.

*Primary Examiner* — Brian L Swenson
(74) *Attorney, Agent, or Firm* — Brooks Kushman P.C.

(57) ABSTRACT

A fan shroud of a motor vehicle has a shroud body which comprises a round airflow opening for a fan impeller. The fan shroud additionally includes a motor mount which is arranged above the airflow opening and is attached by means of a strut to a fastening dome. The fastening dome is attached to the shroud body and is oriented perpendicularly to said shroud body. The radially outer end of the fastening dome, with reference to the airflow opening, is at a varying distance from the mid-point of the airflow opening. This disclosure additionally relates to a cooler fan of a motor vehicle.

18 Claims, 2 Drawing Sheets

(56) References Cited

U.S. PATENT DOCUMENTS

| | | | |
|---|---|---|---|
| 2016/0001629 A1* | 1/2016 | Rohr | F28F 9/002 |
| | | | 165/76 |
| 2016/0146222 A1 | 5/2016 | Avedon | |
| 2018/0003101 A1* | 1/2018 | Kondou | F01P 11/10 |
| 2019/0184785 A1* | 6/2019 | Stauter | B60H 1/3226 |
| 2019/0353083 A1* | 11/2019 | Wichers | F04D 29/542 |

FOREIGN PATENT DOCUMENTS

| | | |
|---|---|---|
| DE | 102012109545 A1 | 4/2014 |
| DE | 102013204069 A1 | 9/2014 |
| DE | 102016203327 A1 | 9/2017 |
| EP | 0661186 A1 | 7/1995 |

\* cited by examiner

FAN SHROUD OF A MOTOR VEHICLE

CROSS-REFERENCE TO RELATED APPLICATIONS

This application claims priority to German patent application Serial No. DE 10 2018 214 782.5 filed Aug. 30, 2018, the disclosure of which is hereby incorporated in its entirety by reference herein.

TECHNICAL FIELD

This disclosure relates to a fan shroud of a motor vehicle which comprises a shroud body. The disclosure additionally relates to a cooler fan of a motor vehicle. The cooler fan is expediently a main fan.

BACKGROUND

Motor vehicles with an internal combustion engine comprise a considerable build-up of heat during operation. A liquid coolant, which, in turn, has to be cooled, is usually used to maintain the operating temperature of the internal combustion engine and also for the operation of an air conditioning system. This usually takes place by means of a cooler network which is acted upon by a driving wind and exchanges heat with the coolant. For example, the coolant is conducted in pipes which are worked into the cooler network. As, in particular at low vehicle speeds, the driving wind is normally insufficient for cooling purposes, it is known to use an electric fan by means of which the driving wind is strengthened.

In this connection, the fan is arranged downstream of the cooler network in the direction of travel. With the assistance of a fan impeller of the fan, the air is sucked through the cooler network and conducted to the internal combustion engine. There the air absorbs the excessive heat of the internal combustion engine and removes it. In this connection, the air contacts the internal combustion engine in a substantially obtuse manner and is deflected by said internal combustion engine, for example by 90°. As a result, turbulence occurs which results in an increase in flow resistance and consequently in a decrease in efficiency. Noise is also generated which is perhaps disruptive.

SUMMARY

The object underlying this disclosure is to provide a particularly suitable fan shroud for a motor vehicle and a particularly suitable cooler fan for a motor vehicle, flow resistance being reduced in particular.

With regard to the fan shroud, said object is achieved according to this disclosure by the features of claim 1 and with regard to the cooler fan by the features of claim 11. Advantageous further developments and designs are the object of the respective dependent claims.

The fan shroud is a component part of a motor vehicle and, in particular, a component part of a cooler fan. In this connection, the fan shroud is suitable, in particular is provided and designed to be mounted on a cooler. For example, the cooler is covered at least in part, conveniently substantially completely by means of the fan shroud, in particular at least parts of the fan shroud abutting against the cooler or being at a spacing from said cooler. The cooler fan and consequently also the fan shroud preferably serve for cooling an internal combustion engine of the motor vehicle. In a convenient manner, a coolant is cooled by means of the cooler, and/or an airflow is conducted to the possible internal combustion engine by means of the fan shroud. The motor vehicle is conveniently land-based and is, for example, a passenger vehicle. As an alternative to this, the motor vehicle is a commercial vehicle, for example a truck or a bus.

The fan shroud includes a shroud body which is preferably designed in a substantially flat manner. Conveniently, the shroud body, in this connection, comprises an enlarged extent, for example by more than ten times, in two dimensions compared to the dimension extending substantially perpendicularly hereto. The dimensions of the shroud body are preferably between 1 m×0.5 m and 0.8 m×0.5 m. For example, the edges of the shroud body are curved so that the shroud body is designed in a substantially shell-like manner.

The shroud body comprises a round airflow opening (air passage, recess). In the mounted state, a fan impeller is arranged inside the airflow opening. In particular, the airflow opening comprises edge-side contours in which corresponding contours of the fan impeller engage in the mounted state. Consequently, leakage air is reduced. The diameter of the airflow opening is conveniently between 0.2 m and 0.6 m. In other words, the fan impeller preferably comprises a diameter which is between 0.2 m and 0.6 m. The fan impeller is expediently arranged in the mounted state substantially parallel to the shroud body and preferably comprises substantially the dimensions of the airflow opening. The fan impeller is rotated, in particular, in a certain direction of rotation during operation. The shroud body is preferably provided and designed in a suitable manner for this purpose.

In addition, the fan shroud includes a motor mount. The motor mount is suitable, in particular is provided and designed to hold an electric motor. In other words, an electric motor is mounted on the mount in the mounted state. The electric motor is, for example, a brush commutator motor. In a particularly preferred manner, however, the electric motor is a brushless direct current motor (BLDC). The fan impeller is driven by means of the electric motor in the mounted state. Consequently, the axis of rotation of the electric motor is perpendicular to the shroud body and in a convenient manner extends in an axial direction with reference to the airflow opening through the mid-point thereof, that is to say perpendicularly to the extent of the airflow opening.

The motor mount is arranged above the airflow opening. In other words, the motor mount is axially offset with reference to the airflow opening, that is to say perpendicular to the extent of the airflow opening and/or of the shroud body. In the case of a projection of the motor mount to the airflow opening perpendicularly to the extent of the shroud body and/or perpendicularly to the airflow opening, the airflow opening is covered at least partially, preferably fully, by means of the motor mount. In a convenient manner, the projection of the motor mount is arranged, in this connection, substantially centrally in the airflow opening.

In addition, the fan shroud includes a strut which is attached to a fastening dome. The strut itself is attached to the motor mount, for example is integrally formed. Consequently, the motor mount is attached to the fastening dome by means of the strut. The fastening dome is attached, preferably fastened, to the shroud body.

Consequently, the motor mount is attached to the shroud body by means of the strut and the fastening dome and is stabilized in this way. The fastening dome is oriented at least partially perpendicularly to the shroud body and consequently comprises an axial progression. In a convenient manner, the fastening dome is oriented fully perpendicularly to the shroud body. In other words, the fastening dome is perpendicular to the airflow opening.

In particular, the spacing between the motor mount and the airflow opening is realized by means of the fastening dome. In a convenient manner, the fastening dome is situated on the same side of the shroud body as the motor mount and the strut, which simplifies construction. The fastening dome comprises a radially outer end with reference to the airflow opening, that is to say in particular with reference to the mid-point of the airflow opening. In this connection, the distance between the radially outer end and the mid-point varies, in particular in the tangential direction with reference to the airflow opening. In other words, the radially outer end of the fastening dome does not describe a circle, the mid-point of which coincides with the mid-point of the airflow opening. Consequently, the distance of the outer end is not constant, and the radially outer boundary of the fastening dome is not delimited by means of a circle-segment-like or cylinder-segment-like surface, the mid-point of which coincides with the mid-point of the airflow opening.

In a convenient manner, the motor mount and/or the fastening dome is/are arranged in the mounted state downstream of the shroud body with reference to the direction of the airflow. In the mounted state, air flows through the airflow opening in particular when the vehicle is moved and/or the fan impeller is driven.

On account of the varying distance of the outer end, it is possible, by means of the fastening dome, to form the air stream passing through the airflow opening during operation and to control it in a suitable manner. In particular, a radial component is introduced into the airstream in this connection at least in part by means of the fastening dome. The fastening dome is suitable, in particular provided and set up for this purpose, and is consequently suitably designed. As a result of this, the air stream, which passes through the airflow opening, does not contact a possible object arranged downstream of it in a simply oblique manner. Consequently, less turbulence is created in the air stream, and, in addition, stall of an air stream is prevented by means of the fastening dome. As a result, a spread of turbulence is reduced so that the flow resistance is reduced.

For example, the fastening dome, the shroud body, the motor mount and/or the struts are each separate components. In a particularly preferred manner, however, the components are integrally formed together. In other words, the fan shroud is expediently created in one piece. The fan shroud is preferably created in one piece from a plastics material. In a preferred manner, the individual components, that is to say the shroud body, the motor mount, the strut and the fastening dome are cast. The complete fan shroud is preferably created using a plastics material injection molding process. Mounting is simplified and mechanical integrity increased in this way.

For example, the shroud body includes a dynamic pressure control valve. This comprises a valve which is pivotably arranged within an opening in the shroud. In the case of comparatively high dynamic (air) pressure, the valve is opened so that an additional passage of air through the shroud body is made possible independently of the airflow opening. Consequently, a comparatively large air throughput through the shroud body is also possible in the case of a comparatively strong air stream which contacts the shroud body, as is the case, in particular, when the motor vehicle is moving at a comparatively high speed. In this case, the airflow opening is open when the motor vehicle is at a standstill, which increases efficiency.

For example, the fastening dome comprises a substantially constant cross section over its progression in the axial direction perpendicularly to the extent thereof, that is to say parallel to the shroud body and/or the airflow opening. In a particularly preferred manner, however, the cross section is modified along the progression thereof, the cross section surface decreasing expediently as the distance to the shroud body increases. In this connection, the cross section is modified, for example, or in a particularly preferred manner is similar but simply made smaller. On account of the consequently tapering cross section, in particular of the scaling, improved conducting of the air stream is made possible so that the air stream is prevented from stalling even where an axial end of the fastening dome is at a spacing from the shroud body. For example, reinforcing ribs, which extend, for example, radially and/or tangentially, are attached to the fastening dome on the radially outer end thereof. In a preferred manner, the reinforcing ribs comprise at least one at least radial component. The reinforcing ribs are conveniently designed in a platelet shape. The position of the fastening dome is stabilized by means of the reinforcing ribs, which increases robustness.

For example, the maximum extent of the fastening dome perpendicular to the extent thereof, that is to say parallel to the shroud body and/or the airflow opening, is between 0.1 m and 0.01 m. Consequently, a comparatively compact fastening dome is realized. As an alternative to this or in combination with it, the maximum extent of the fastening dome along the extent thereof, that is to say perpendicular to the shroud body and/or the airflow opening, is between 0.03 m and 0.2 m. The fastening dome comprises expediently, with reference to the airflow opening, a progression at least partially in the tangential direction. In particular, the extent in the tangential direction is between 10% and 60% of the extent of the fastening dome in the axial direction, that is to say perpendicular to the airflow opening. Consequently, the fastening dome is comparatively robust.

For example, in addition, the distance between the radially inner end of the fastening dome, determined with reference to the airflow opening, and the mid-point of the airflow opening varies. In a particularly preferred manner, however, the distance between the radially inner end of the fastening dome and the mid-point of the airflow opening is constant. In other words, the radially inner end of the fastening dome is formed corresponding to a circle segment or cylinder segment. In this way, the air stream passing through the airflow opening in a substantially straight-lined manner is swirled comparatively little. In particular, in this connection, the wall of the fastening dome situated on said side is designed to be comparatively smooth so that turbulence formation is further reduced. The radius of the airflow opening is preferably the distance between the radially inner end to the mid-point so that the fastening dome is aligned with the airflow opening. As a result, it is situated comparatively close to the motor mount, which is why the installation size of the shroud body is reduced. The stability of the motor mount is also increased. In addition, the radially inner end of the fastening dome causes the air stream passing through the airflow opening to be conducted in a substantially straight-lined manner, which further increases the efficiency. On account of the constant distance, the cross section of the fastening dome parallel to the airflow opening is consequently not symmetrical with reference to a tangential straight. In an alternative to this, the cross section is, for example, symmetrical, and the distance between the radially inner end and the mid-point is consequently not constant.

The fastening dome preferably includes a thickening which extends conveniently in the radial direction with reference to the airflow opening. The thickening is situated, for example, between the two tangential ends of the fastening dome with reference to the airflow opening. For example, the fastening dome comprises a circle segment as cross section perpendicular to the airflow opening, the mid-point of the circle being displaced from the mid-point of the airflow opening in the direction of the fastening dome. In a particularly preferred manner, however, the thickening is offset in an opposite direction to a direction of rotation of the fan impeller, that is to say in the tangential direction. The fastening dome is stabilized by the thickening so that the robustness is increased. On account of the displacement in the opposite direction to the direction of rotation, the flow resistance of the fastening dome to the air stream is reduced, and turbulence is consequently further reduced. In particular, the largest extent of the fastening dome in the radial direction is offset in the opposite direction to the direction of rotation of the fan impeller. The likelihood of an air stream flowing around the fastening dome substantially in the tangential direction stalling is consequently further reduced and any flow resistance is consequently reduced further.

The end of the fastening dome that is tangential with reference to the airflow opening and is offset in the opposite direction to the direction of rotation of the fan impeller is preferably rounded. Consequently, the air stream which is set into a rotational movement during operation by means of the fan impeller, contacts the rounded end of the fastening dome, insofar as the air stream additionally comprises a radial component, for example as a result of centrifugal forces. Flow resistance is further reduced on account of the rounded end. As an alternative to this or in combination with it, the tangential end of the fastening dome offset in the direction of rotation is also rounded. Also operating the fan impeller in the opposite direction to the direction of rotation, that is to say in two directions of rotation, is consequently made possible, flow resistance being reduced here too. As an alternative to this, the end is substantially tapered. On account of the end being designed in such a manner, stalling after flowing around the fastening dome is avoided, which is why the flow resistance is reduced further.

In an expedient manner, the boundary of the fastening dome is designed to be smooth in the radial direction with reference to the airflow opening, in particular the radial outer end thereof. The fastening dome preferably includes a substantially smooth surface in said portion. The surface is conveniently designed in a concave manner. In other words, the surface is expediently curved only in one direction. Consequently, flow resistance is further reduced and construction simplified. In a particularly preferred manner, the cross section of the fastening dome comprises an aerodynamic profile parallel to the shroud body. In other words, the cross section is designed in a substantially wing-shaped manner. Flow stalling is reliably prevented by means of such a choice. In an expedient manner, the cross section of the fastening dome is designed in a droplet-shaped manner parallel to the shroud body. Consequently, the fastening dome comprises a comparatively small $c_w$-value, and flow resistance is further reduced.

For example, the fastening dome is designed as a solid part. In a particularly preferred manner, the fastening dome is, however, hollow. In this connection, the fastening dome comprises an opening which extends, in particular, perpendicularly to the airflow opening, that is to say in the axial direction. The opening is expediently designed in a blind-hole-like manner and/or is closed on one side by means of the shroud body. On account of such a design, the weight of the fastening dome is reduced so that mounting is simplified. The costs of materials are also reduced. In addition, producing a comparatively large fastening dome, that is to say, in particular one with a comparatively large periphery, is also made possible in this way, which increases robustness. On account of the opening, it is also possible to produce the fastening dome with a constant wall thickness and/or with a wall thickness which does not exceed a certain value, for example 0.5 cm. Consequently, production in a plastics material injection molding process is also possible, deformation being able to be substantially excluded. Thus, a thickness of the wall of the fastening dome is limited on account of the airflow opening, which is why the fastening dome can be created in a normal process using a plastics material injection molding method, comparatively low production tolerances being able to be chosen.

The fan shroud preferably includes an edge which is attached to the shroud body, preferably integrally molded on and in a particularly preferred manner in one piece with said shroud body. In an expedient manner, the edge surrounds the airflow opening on the circumferential side. The airflow opening is consequently delimited conveniently by means of the edge. The edge is in particular designed in a substantially hollow cylindrical manner and comprises, for example, an extent of between 0.01 m and 0.05 cm perpendicularly to the shroud body, that is to say in the axial direction. The air stream is conducted through the airflow opening comparatively effectively during operation by means of the edge. The edge also ensures that the air stream actually passes the fan impeller and formation of leakage air is reduced. The edge is conveniently arranged concentrically with respect to the airflow opening and/or to the possible fan impeller. The edge expediently merges into the fastening dome. Consequently, the fastening dome and the edge are mutually stabilized, which increases the robustness of the fan shroud. Installation space is also reduced in this way. The edge expediently forms the radially inner end of the fastening dome at least in part.

The strut comprises, for example, at least in part, a radial progression with reference to the airflow opening. In a particularly preferred manner, however, the strut is arranged strictly radially and consequently lies in a plane which is perpendicular to the extent of the airflow opening and reaches through the mid-point of the airflow opening. Consequently, the strut comprises a comparatively short length, which is why its weight is reduced. The rigidity of the strut is also increased in this way so that the robustness of the fan shroud is increased. In this connection, the strut has its largest extent, for example, in the radial direction. In particular, the extent in said direction is greater than two times, four times or ten times the extent in the other direction.

In a particularly preferred manner, the strut is inclined with reference to the shroud body. Consequently, the strut comprises at least one component in the axial direction and/or tangential direction when the extent of the strut in said directions is also reduced expediently compared to the radial extent. Consequently, the strut encloses an angle with reference to the shroud body and consequently also with reference to the fastening dome. In particular, the angle is between 30° and 75°. For example, the angle is between 40° and 50°. On account of the inclination, the air stream which passes through the airflow opening is additionally conducted by means of the strut, and the strut comprises a smaller flow resistance. The strut preferably comprises a profile, in particular perpendicularly to the progression thereof. In a particularly preferred manner, the profile is an aerodynamic profile and/or is designed in a droplet-shaped manner. Consequently, flow resistance is further reduced and formation of turbulent flows avoided. As a consequence, efficiency is further increased. The inclination of the strut is preferably dependent on the individual application and on the amount of air to be conveyed.

The fan shroud preferably includes further struts and further fastening domes. In this connection, all struts and fastening domes serve for attaching the motor mount to the shroud body. In this case, all struts are attached to the motor mount, expediently to the ends thereof. There are preferably the same number of fastening domes as struts, and they are consequently suitably assigned to one another. All fastening domes and/or struts are preferably designed so as to be structurally identical to one another, which simplifies production. In particular, the struts and/or fastening domes are arranged in a rotationally symmetrical manner with reference to the mid-point of the airflow opening. For example, the fan shroud comprises between two and fourteen such struts or fastening domes. Consequently, the fan shroud preferably includes a total of between three and fifteen such struts or fastening domes.

The cooler fan is a component part of a motor vehicle and serves expediently for cooling an internal combustion engine. In other words, the cooler fan is a main fan. As an alternative to this, the cooler fan is, for example, a component part of an air conditioning system or of an auxiliary unit of the motor vehicle. The cooler fan includes a cooler which comprises in particular a cooler network, through which a number of pipes are preferably conducted. The cooler network, in this connection, is expediently in thermal contact with the pipes. In a preferred manner, a coolant is conducted inside the pipes in operation. The cooler network is designed, for example, in a substantially cuboid manner. In addition, the cooler fan includes a fan shroud with a shroud body which comprises a round airflow opening for a fan impeller. In addition, the fan shroud includes a motor mount which is arranged above the airflow opening and is attached to a fastening dome by means of a strut, expediently by means of multiple struts. The fastening dome is attached to the shroud body and is oriented perpendicularly to said shroud body. The radially outer end of the fastening dome with reference to the airflow opening is at a varying distance from the mid-point of the airflow opening.

The fan shroud is attached, expediently fastened, to the cooler. For example, the fan shroud is screw-connected to the cooler or is bonded to said cooler. In particular, the fan shroud covers the possible cooler network. In other words, the fan shroud is congruent with the cooler network or, for example, with the complete cooler. Consequently, air is prevented from passing between the cooler and the fan shroud and the air is guided comparatively efficiently by means of the fan shroud as a result. The fan shroud is preferably arranged downstream of the cooler, that is to say expediently behind the cooler in the direction of travel of the motor vehicle. The fastening dome, in this connection, extends conveniently away from the cooler.

The cooler fan preferably includes an electric motor which is held by means of the motor mount. The electric motor is, for example, a brush commutator motor. In a particularly preferred manner, however, the electric motor is a brushless direct current motor (BLDC). In this connection, an axis of rotation of the electric motor is arranged perpendicularly to the airflow opening and extends, in particular, along an axial straight which reaches through the mid-point of the airflow opening. For example, the electric motor is bonded or screw-connected to the motor mount. Consequently, the electric motor is held comparatively securely on the motor mount.

In addition, the cooler fan includes a fan impeller which is arranged in the airflow opening. The fan impeller is preferably arranged parallel to the airflow opening and lies expediently in a plane with the shroud body. The fan impeller is driven by means of the electric motor and is preferably attached to said electric motor, for example to a shaft of the electric motor. For example, the fan impeller comprises a hub which is coupled directly with the electric motor in a mechanical manner. A number of fan impeller blades, which comprise, in particular, a radial and for example at least in part tangential progression, are preferably attached to the hub. For example, the fan impeller additionally includes an outer ring, to which the fan impeller blades are attached at the radial ends thereof. The fan impeller blades are stabilized, in this connection, by means of the outer ring, which improves the acoustic impression. In particular, the outer ring engages in a corresponding receiving means or contour of the shroud body, these preferably being spaced apart from one another. A labyrinth seal is formed, in particular, between said parts. Consequently, dispersal of leakage air is prevented. As an alternative to this or in combination with it, a brush seal or the like is arranged between the possible outer ring and the shroud body. The edge of the fan shroud, which is attached to the shroud body, is preferably available. The outer ring is preferably surrounded by the edge. In this connection, realization of a seal between said parts is simplified as a result of the edge.

The advantages and further developments named in connection with the fan shroud are also to be transferred analogously to the cooler fan and vice versa.

BRIEF DESCRIPTION OF THE DRAWINGS

An exemplary embodiment is explained in more detail below by way of a drawing, in which.

Parts which correspond to one another are provided with the same reference symbols in all the figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
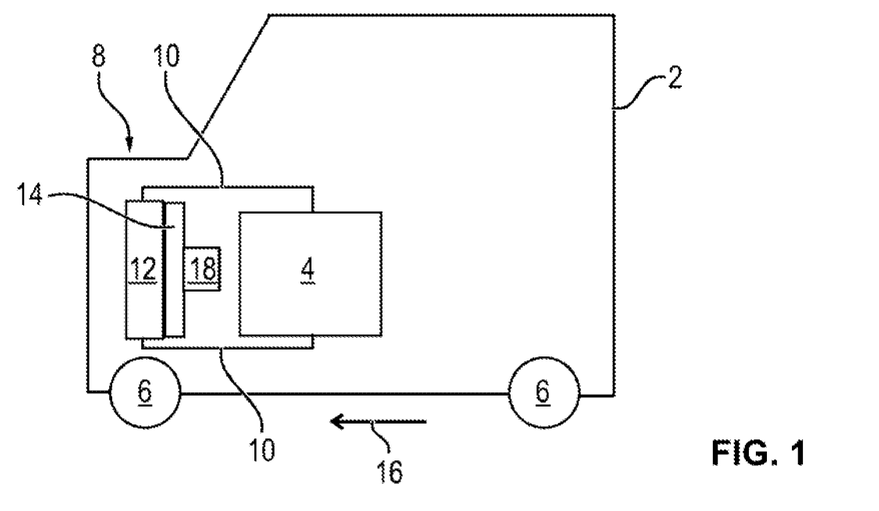
FIG. 1 shows a schematic representation of a land-based motor vehicle with a cooler fan.

FIG. 1 shows a simplified schematic representation of a motor vehicle 2 with an internal combustion engine 4. The motor vehicle 2 is driven by means of the internal combustion engine 4. For this purpose, the internal combustion engine 4 is operatively connected to at least one of the four wheels 6 of the motor vehicle 2 by means of a drive train which is not shown in any more detail. In addition, the motor vehicle 2 includes a cooler fan 8 which serves for cooling the internal combustion engine 4. Consequently, the cooler fan 8 is a main fan of the motor vehicle 2. The cooler fan 8 is connected to the internal combustion engine 4 in a fluid-technical manner by means of a number of lines 10, through which a coolant is conducted during operation from the cooler fan 8 to the internal combustion engine 4 and there through cooling channels. Excessive heat is absorbed by means of the coolant and run back to the cooler fan 8, by means of which the coolant is cooled.

The cooler fan 8 comprises a heat exchanger or cooler 12 with a cooler network which is not shown in any more detail, through which cooler network a number of pipes are run and are in thermal contact therewith. The pipes are coupled in a fluid-technical manner with the lines 10 so that, in operation, the coolant is conducted through the pipes. The cooler fan 8 additionally includes a fan shroud 14 which is arranged downstream of the cooler 12 in a direction of travel 16 of the motor vehicle 2. An electric motor 18 is fastened to the fan shroud 14. In operation, airflow passes through the cooler 12 and is formed suitably by means of the fan shroud 14. When the motor vehicle 2 stands still, air is sucked through the cooler 12 by means of the electric motor 8 so that, in operation, the cooler 12 is traversed substantially always by the air stream or at least in dependence on existing requirements. The cooler 12 is consequently cooled, which is why the cooler fan 8 does not overheat even after the internal combustion engine 4 has been operating for a comparatively long time. In addition, the air passing through the cooler fan 8 is conducted to the internal combustion engine 4 by means of the fan shroud 14 and said internal combustion engine is additionally cooled from outside in this way.

Figure 2:
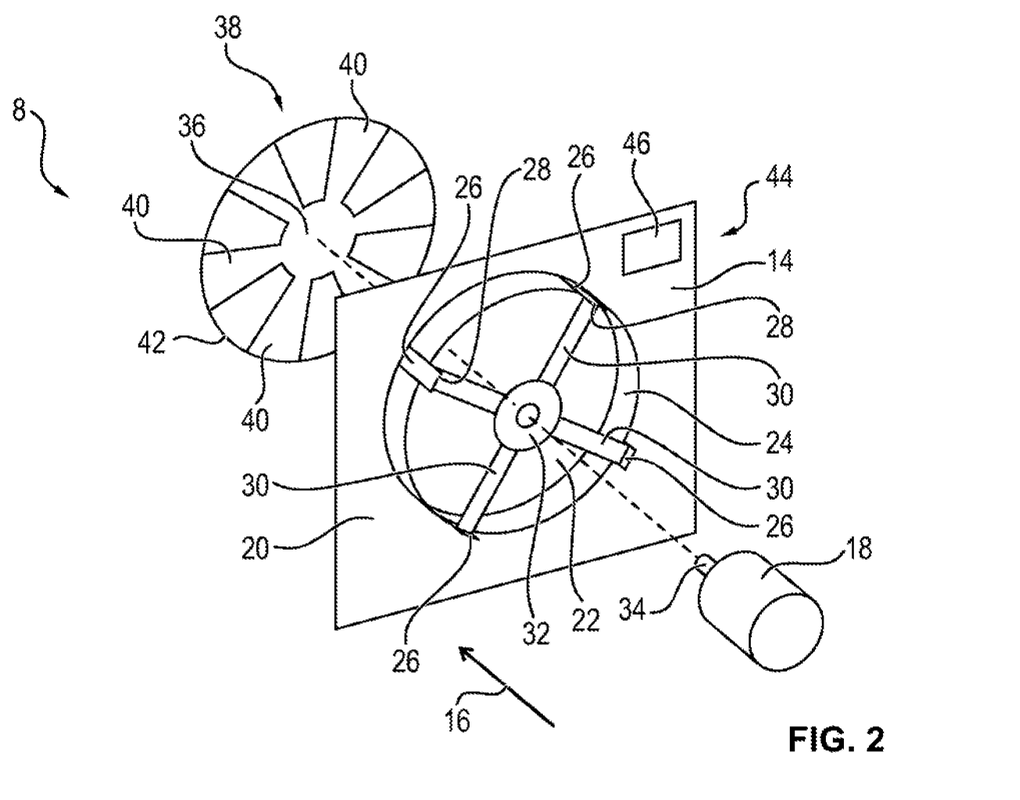
FIG. 2 shows a simplified schematic representation of an exploded drawing of the cooler fan in part with a fan shroud.

FIG. 2 shows a simplified schematic representation in perspective of an exploded drawing of the cooler fan 8, the cooler 12 being omitted. The fan shroud 14 is fastened to the cooler 12 and fully covers the cooler network, which is not shown in any more detail, and is congruent with the same. The fan shroud 14 includes a shroud body 20 which is designed in a substantially flat manner. The shroud body 20 comprises a round airflow opening 22 which, just as the shroud body 20, is oriented perpendicularly to the direction of travel 16. The airflow opening 22 comprises a diameter of 30 cm and is surrounded circumferentially by an edge 24 which is designed in a hollow cylindrical manner and is arranged concentrically to the airflow opening 22. The diameter of the edge 24 is equal to the diameter of the airflow opening 22, and the edge 24 comprises a length of 2 cm in the axial direction with reference to the airflow opening 22, that is to say parallel to the direction of travel 16. In the mounted state, the edge 24 is situated on the side of the shroud body 20 remote from the cooler 12.

The fan shroud 14 additionally includes a total of four structurally identical protrusions or fastening domes 26 which are arranged in a rotationally symmetrical manner with reference to the airflow opening 22. In this connection, the edge 24 merges into the fastening dome 26, the radially inner surfaces or inner ends 28 thereof also being at a distance of 15 cm from the mid-point. The radially inner ends 28 are defined, in this case, with reference to the airflow opening 22 and the mid-point thereof. The fastening domes 26 extend with reference to the airflow 22, that is to say in the opposite direction to the direction of travel 16, away from the cooler 12. The fastening domes 26 are consequently oriented perpendicularly to the shroud body 20 and extend substantially in the opposite direction to the direction of travel 16. In each case, a strut 30 is integrally molded on and consequently attached to each of the fastening domes 26, said struts each comprising a radial progression and being structurally identical to one another. In this connection, the struts 30 are at a distance from the shroud body 20 in the axial direction, that is to say parallel to the direction of travel 16. A motor mount 32, which is consequently arranged above the airflow opening 22 and is positioned concentrically to said airflow opening, is attached to the remaining free ends of the beam-shaped struts 30. The motor mount 32 is ring-shaped and comprises a diameter of 10 cm. The motor mount 32, the struts 30, the fastening domes 26, the edge 24 and the shroud body 20 are produced in one piece together in a plastics material injection molding process, for example from a polyamide (PA).

In the mounted state, the electric motor 18 is held by the motor mount 32, and the electric motor 18 is consequently fastened to said motor mount. In this connection, the electric motor 18 is situated on the side of the fan shroud 14 located opposite the cooler 12. A shaft 34 of the electric motor 18 projects through the motor mount 32 in the direction of travel 16 and is non-rotatably fastened to a hub 36 of a fan impeller 38. The fan impeller 38 is consequently driven by means of the electric motor 18 which is held by means of the motor mount 32. A number of fan impeller blades 40, which are surrounded circumferentially by means of an outer ring 42 and are attached to said outer ring, are attached to the hub 36. The hub 36, the fan impeller blades 40 and the outer ring 42 are created in one piece in a plastics material injection molding process.

In the mounted state, the fan impeller 38 is arranged inside the airflow opening 22 parallel to said airflow opening, the outer ring 42 being surrounded radially in a circumferential manner by means of the edge 24. In operation, the fan impeller 38 is rotated by means of the electric motor 18 and air is consequently sucked through the airflow opening 22 in the opposite direction to the direction of travel 16. In this case, a movement component in the axial direction, that is to say in the opposite direction to the direction of travel 16 and in the radial direction with reference to the airflow opening 22, is introduced into the air stream on account of the rotational movement. Air is prevented from flowing through between the outer ring 42 and the edge 24 on account of a seal, not shown in any more detail, for example a labyrinth seal.

In addition, the fan shroud 14 includes a dynamic pressure control valve 44 which includes an opening which is covered by means of a valve 46. If a comparatively high (air) pressure prevails in the direction of travel 16 upstream of the fan shroud 14, in particular in the case of the motor vehicle 2 moving in a comparatively quick manner, the air is obstructed in part from passing through the airflow opening 22 on account of the fan impeller 38 or the fan impeller 38 would have to be rotated comparatively quickly. However, this would result in increased load on the electric motor 18 and on the further components and in an increased noise development. The valve 46 is consequently pivoted from a certain pressure and the opening released so that air is able to flow through said valve. Consequently, the throughput of air through the cooler 12, which is situated upstream of the fan shroud 14 in the direction of travel 16, is increased. In the case of comparatively low air pressure upstream of the fan shroud 14, as is the case when the motor vehicle 2 is at a standstill, the valve 46 is closed so that the forming of a circular air stream which just passes through the opening of the dynamic pressure control valve 46 and the airflow opening 22 is prevented. Consequently, the cooler 12 is also always traversed by a sufficient air stream.

Figure 3:
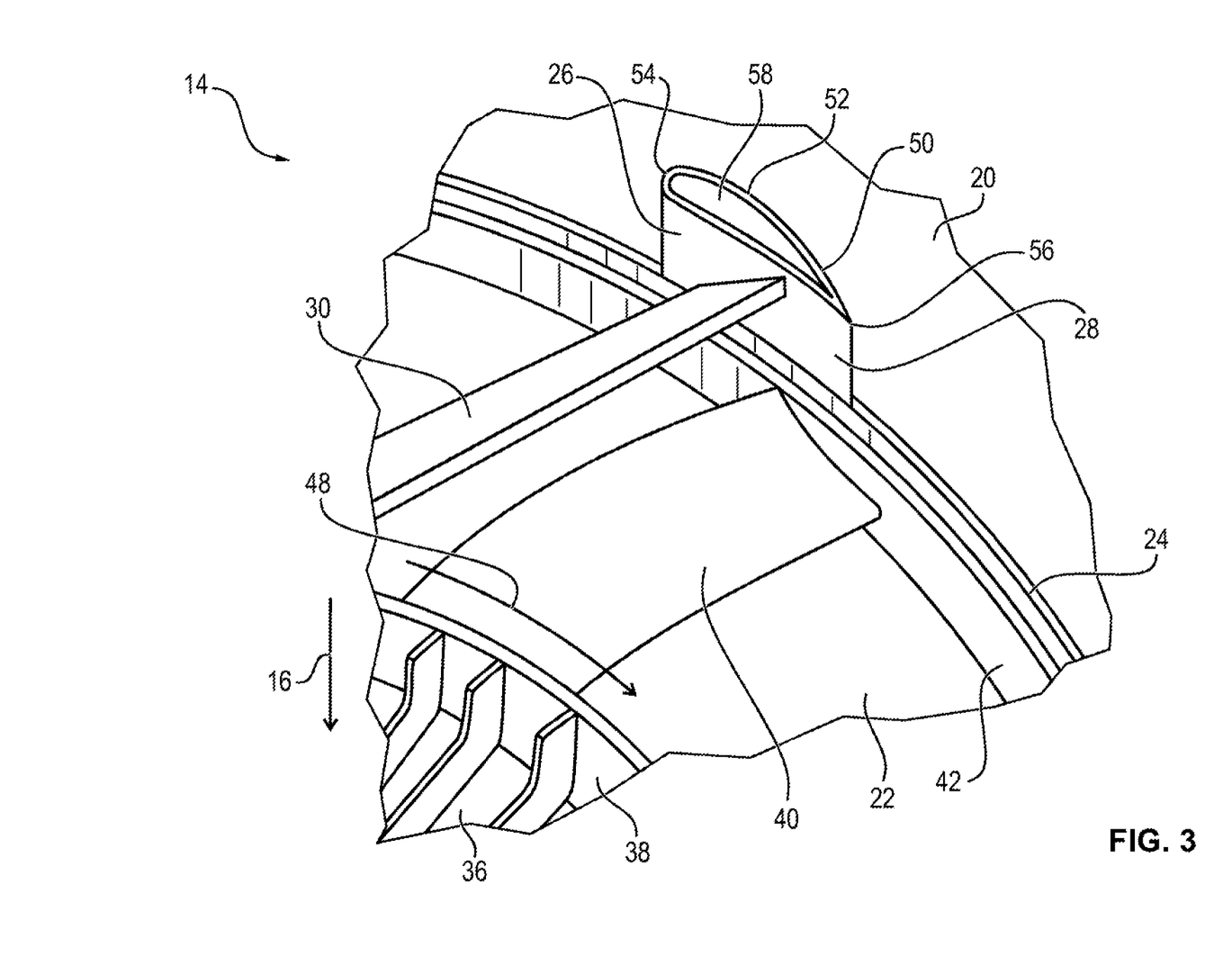
FIG. 3 shows a perspective representation of a detail of the fan shroud.

FIG. 3 shows a perspective representation of a detail of the fan shroud 14, the airflow opening 22 only being shown in part. The fan impeller 38, which includes the pot-shaped hub 36, the opening of which is oriented in the opposite direction to the direction of travel 16, is positioned in the airflow opening 22. In the mounted state, the electric motor 18, by means of which the fan impeller 38 is rotated in a direction of rotation 48, lies at least in part inside the hub 36. In this connection, the fan impeller blades 40, which are surrounded by the outer ring 42, are suitably formed.

The edge 24 merges into the radially inner end 28 of the only shown fastening dome 26 which is consequently designed in smooth manner. The fastening dome 26 comprises a droplet-shaped cross section perpendicularly to the axial direction, that is to say perpendicularly to the direction of travel 16 and parallel to the shroud body 20. As a consequence, the radially outer surface or outer end 50 of the fastening dome 26, which is defined with reference to the airflow opening 22, is at a varying distance from the mid-point of the airflow opening 22. Consequently, the fastening dome 26, on account of the constant distance between the radially inner end 28 and the mid-point of the airflow opening 22, comprises a thickening 52. The thickening 52 is offset in the opposite direction to the direction of rotation 48 of the fan impeller 38, and the tangential end 54 of the fastening dome 26 situated there is rounded. In other words, the position of the end 54 is defined with reference to the airflow opening 22. The opposite end 56, that is to say the tangential end 56 of the fastening dome 26 offset in the direction of rotation 48 of the fan impeller 38, is tapered so that the droplet shape is formed. Consequently, the fastening dome 26 of the droplet-shaped cross section comprises an aerodynamic profile.

In operation, air is sucked through the airflow opening 22 counter to the direction of travel 16 by means of the fan impeller 38, said air comprising an axial movement component with reference to the airflow opening 22. On account of the rotational movement of the fan impeller 38, the air is additionally set in rotation and consequently comprises a tangential movement component (swirl). On account of the centrifugal forces occurring in this case, the air is additionally moved outward in the radial direction with reference to the airflow opening 22. There it contacts the fastening domes 26, the air initially contacting the rounded end 54. On account of the aerodynamic profile, a substantially laminar flow is realized, and the air stream is prevented from stalling at the fastening dome 26, even if the air stream is conducted to the internal combustion engine. Efficiency is consequently increased, and a required output to drive the fan impeller 38 is reduced. Noise development is also reduced.

The struts 30 are additionally inclined with reference to the shroud body 20 and consequently, also with reference to the direction of travel 16, enclose an angle which deviates from 90°. In particular, the angle is between 40° and 50°. Consequently, the air is conducted additionally by means of the struts 30, and an effective cross sectional area for the air stream is reduced. In particular, the strut 30 also comprises an aerodynamic profile as cross section in the radial direction with reference to the airflow opening 22, which further reduces a formation of turbulence.

The fastening dome 26 is designed in a hollow manner and comprises an opening 58, which extends in the axial direction, that is to say parallel to the direction of travel 16, and is designed in the manner of a blind hole. The weight is reduced on account of the opening 58. A maximum thickness of the plastics material is also reduced in this way so that comparatively simple production is made possible without anticipating the fastening dome 26 being deformed when the plastics material hardens and/or when it is removed from a mold.

In summary, the attachment of the struts 30 to the shroud body 20, namely the fastening domes 26, in the axial direction, that is to say parallel to the direction of travel 16, is designed as a strung flow profile, the inflow side of which is in the opposite direction to the direction of rotation of the fan, that is to say the direction of rotation 48. In other words, the end 54 of the fastening dome 26, which is tangential with reference to the airflow opening 22 and is offset in the opposite direction to the direction of rotation 48 of the fan impeller 38, is rounded, and the fastening dome 26 comprises the thickening 52 which is offset in the opposite direction to the direction of rotation 48 of the fan impeller 38. Consequently, lower flow resistance is realized for the air emerging with circumferential components. Less flow separation also occurs in said region, that is to say fewer stalls.

For example, the cross section of the fastening dome 26 is constant or it is reduced in the opposite direction to the direction of travel 16 as the distance from the shroud body 20 increases. In other words, the fastening dome 26 is scaled and designed with a bevel. As an alternative to this or in combination with it, the fastening dome 26 is a hollow body and is consequently hollow. In this way, production is possible, in particular, with a one-sided core in the injection molding process. In particular, the injection molding mold comprises just one one-sided core. Consequently, openings can be omitted in the mold in the region between the shroud body 20 and the airflow opening 22. It is also possible to influence the rigidity in dependence on the profile design of the fastening dome 26.

The disclosure is not limited to the exemplary embodiment described above. On the contrary, other variants of the disclosure can also be derived here from by the expert without departing from the object of the disclosure. In addition, in particular, all the individual features described in connection with the exemplary embodiment are able to be combined together in another manner without departing from the object of the disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

LIST OF REFERENCES

2 Motor vehicle
4 Internal combustion engine
6 Wheel
8 Cooler fan
10 Line
12 Cooler
14 Fan shroud
16 Direction of travel
18 Electric motor
20 Shroud body
22 Airflow opening
24 Edge
26 Fastening dome
28 Radially inner end
30 Strut 32 Motor mount
34 Shaft
36 Hub
38 Fan impeller
40 Fan impeller blade
42 Outer ring
44 Dynamic pressure control valve
46 Valve
48 Direction of rotation
50 Radially outer end
52 Thickening
54 End
56 End
58 Opening

What is claimed is:

1. A fan shroud of a motor vehicle comprising: a shroud body defining a round airflow opening for a fan impeller and including a motor mount arranged above the airflow opening and attached by a strut to a fastening dome, wherein the fastening dome is attached to the shroud body and is oriented at least in part perpendicularly to said shroud body, wherein a radially outer end of the fastening dome is at a varying distance from a mid-point of the airflow opening, and wherein the fastening dome includes an end that is tangential with reference to the airflow opening and is offset in the opposite direction to the direction of rotation of the fan impeller, wherein the end of the fastening dome is rounded.

2. The fan shroud of claim 1, wherein the radially inner end of the fastening dome is at a constant distance from the mid-point of the airflow opening.

3. The fan shroud of claim 1, wherein the fastening dome comprises a thickening which is offset in an opposite direction to a direction of rotation of the fan impeller.

4. The fan shroud of claim 1, wherein the fastening dome includes a cross-section that is parallel to the shroud body and is droplet-shaped.

5. The fan shroud of claim 1, wherein the fastening dome is hollow.

6. The fan shroud of claim 1 further comprising an edge surrounding the airflow opening circumferentially and merging into the fastening dome, wherein the edge is attached to the shroud body.

7. The fan shroud of claim 1, wherein the strut extends radially with reference to the airflow opening.

8. The fan shroud of claim 1, wherein the strut is inclined with reference to the shroud body.

9. The fan shroud of claim 1, wherein the fan shroud includes between two and fourteen structurally identical struts and between two and fourteen structurally identical fastening domes.

10. A cooling system for a motor vehicle comprising:
a heat exchanger;
a fan configured to direct air across the heat exchanger; and
a fan shroud secured to the heat exchanger, the fan shroud, having a shroud body,
defining an opening receiving the fan such that the fan rotates about an axis,
having at least one protrusion disposed radially outward of the opening and extending axially from the shroud body relative to the axis, each of the at least one protrusions having an outer surface that faces radially outward relative to the opening, wherein a distance between each of the outer surfaces a mid-point of the opening varies, and wherein a cross-section of each of the at least one protrusions is parallel to the shroud body and is droplet-shaped, and
having a motor mount which is disposed over the opening and is secured to the shroud body via at least one strut, each of the at least one struts extending between the motor mount and one of the at least one protrusions.

11. The cooling system of claim 10 further comprising an electric motor secured to the motor mount, wherein the electric motor configured to drive the fan.

12. The cooling system of claim 10, wherein the at least one protrusions are perpendicular to the shroud body.

13. The cooling system of claim 10, wherein each of the at least one protrusions have an inner surface that faces radially inward relative to the opening, and wherein a distance between each of the inner surfaces and the mid-point of the opening is constant.

14. The cooling system of claim 10, wherein each of the at least one protrusions have a thickness that increases in an opposite direction to a direction of rotation of the fan.

15. The cooling system of claim 10, wherein an edge of the shroud body circumferentially surrounds the opening and merges into the at least one protrusion.

16. The cooling system of claim 10, wherein each of the at least one struts is inclined with respect to the shroud body at an angle that ranges between 30° and 75°.

17. A fan shroud of a motor vehicle comprising:
a shroud body defining a round airflow opening for a fan impeller and including a motor mount arranged above the airflow opening and attached by a strut to a fastening dome, wherein the fastening dome is attached to the shroud body and is oriented at least in part perpendicularly to said shroud body, wherein a radially outer end of the fastening dome is at a varying distance from a mid-point of the airflow opening, and wherein the fastening dome includes a cross-section that is parallel to the shroud body and is droplet-shaped.

18. A fan shroud of a motor vehicle comprising:
a shroud body defining a round airflow opening for a fan impeller and including a motor mount arranged above the airflow opening and attached by a strut to a fastening dome, wherein the fastening dome is attached to the shroud body and is oriented at least in part perpendicularly to said shroud body, wherein a radially outer end of the fastening dome is at a varying distance from a mid-point of the airflow opening, and wherein the fastening dome is hollow.

* * * * *